(12) United States Patent
Welchko et al.

(10) Patent No.: US 12,024,025 B2
(45) Date of Patent: Jul. 2, 2024

(54) INTELLIGENT MOTOR SYSTEMS AND CONTROL LOGIC FOR CREATING HEAT WITH CONSTANT OFFSET TORQUE IN STATIONARY VEHICLES

(71) Applicant: GM GLOBAL TECHNOLOGY OPERATIONS LLC, Detroit, MI (US)

(72) Inventors: Brian A. Welchko, Oakland Township, MI (US); Vinod Chowdary Peddi, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 328 days.

(21) Appl. No.: 17/669,690

(22) Filed: Feb. 11, 2022

(65) Prior Publication Data
US 2023/0256833 A1    Aug. 17, 2023

(51) Int. Cl.
G05D 23/275    (2006.01)
B60L 15/02     (2006.01)
B60W 10/08     (2006.01)

(52) U.S. Cl.
CPC ........... B60L 15/02 (2013.01); B60W 10/08 (2013.01); *B60L 2240/36* (2013.01);
(Continued)

(58) Field of Classification Search
CPC ..... H02P 27/06; H02P 27/08; G05B 19/4086; B60L 15/02; B60L 2240/36;
(Continued)

(56) References Cited

U.S. PATENT DOCUMENTS 6,356,838 B1    3/2002  Paul
6,697,730 B2    2/2004  Dickerson
(Continued)

FOREIGN PATENT DOCUMENTS

DE    102012218017 A1 *  4/2013 .............. B60L 15/20
DE    102014016567 A1    5/2016
EP    2610836 A1          7/2013

OTHER PUBLICATIONS

Min-Joong Kim, et al., "Method and Apparatus for Controlling a Multi-Mode Powertrain System of a Vehicle", U.S. Appl. No. 17/034,445, filed Sep. 28, 2020, 34 pages.

*Primary Examiner* — Karen Masih
(74) *Attorney, Agent, or Firm* — Quinn IP Law

(57) ABSTRACT

Presented are motor control systems, vehicles, and methods for generating motor heat while holding an offset motor torque during stationary vehicle operation. A method of operating an AC motor includes a resident or remote vehicle controller receiving a mode request to operate a vehicle in a stationary mode, and a temperature request including the AC motor generating motor heat during the stationary operating mode. The controller determines an offset motor torque to generate the motor heat and hold the AC motor's output member at a select position when operating the vehicle in the stationary mode. Using a DQ transform model of the AC motor, the controller selects multiple dq current trajectories located in respective dq operating quadrants of the DQ transform model based on the offset motor torque. The controller then commands a power inverter to transmit electrical current to the AC motor based on the select dq current trajectories.

20 Claims, 4 Drawing Sheets

(52) U.S. Cl.
CPC ..... *B60L 2240/423* (2013.01); *B60L 2240/52* (2013.01); *B60W 2510/087* (2013.01); *B60W 2710/083* (2013.01)

(58) Field of Classification Search
CPC .......... B60L 2240/423; B60L 2240/52; B60W 10/08; B60W 2510/087; B60W 2710/083
See application file for complete search history.

(56) References Cited

U.S. PATENT DOCUMENTS

| | | | |
|---|---|---|---|
| 7,266,438 B2 | 9/2007 | Kellum et al. | |
| 7,589,643 B2 | 9/2009 | Pagci et al. | |
| 7,739,036 B2 | 6/2010 | Grimm et al. | |
| 7,840,427 B2 | 11/2010 | O'Sullivan | |
| 8,050,855 B2 | 11/2011 | Coy et al. | |
| 8,170,739 B2 | 5/2012 | Lee | |
| 8,384,532 B2 | 2/2013 | Szczerba et al. | |
| 8,428,843 B2 | 4/2013 | Lee et al. | |
| 8,605,011 B2 | 12/2013 | Seder et al. | |
| 8,612,139 B2 | 12/2013 | Wang et al. | |
| 8,633,979 B2 | 1/2014 | Szczerba et al. | |
| 8,692,739 B2 | 4/2014 | Mathieu et al. | |
| 8,818,708 B2 | 8/2014 | Mathieu et al. | |
| 8,849,515 B2 | 9/2014 | Moshchuk et al. | |
| 8,996,273 B2 | 3/2015 | Lee et al. | |
| 9,014,915 B2 | 4/2015 | Chatterjee et al. | |
| 9,099,006 B2 | 8/2015 | Mudalige et al. | |
| 9,229,453 B1 | 1/2016 | Lee | |
| 9,238,412 B2 | 1/2016 | Kidston et al. | |
| 9,267,810 B2 | 2/2016 | Pritchard | |
| 9,283,967 B2 | 3/2016 | Lee | |
| 9,443,429 B2 | 9/2016 | Mathieu et al. | |
| 9,487,212 B1 | 11/2016 | Adam et al. | |
| 9,809,130 B2 | 11/2017 | Heisel et al. | |
| 9,868,443 B2 | 1/2018 | Zeng et al. | |
| 9,931,963 B2 | 4/2018 | Heisel et al. | |
| 10,005,363 B1 | 6/2018 | Correia et al. | |
| 10,227,021 B2 | 3/2019 | Lor et al. | |
| 10,259,341 B2 | 4/2019 | Lor et al. | |
| 10,556,587 B2 | 2/2020 | Michaluk | |
| 2009/0030885 A1 | 1/2009 | DePasquale et al. | |
| 2010/0228415 A1 | 9/2010 | Paul | |
| 2011/0059693 A1 | 3/2011 | O'Sullivan | |
| 2011/0313880 A1 | 12/2011 | Paul et al. | |
| 2012/0101713 A1 | 4/2012 | Moshchuk et al. | |
| 2012/0239452 A1 | 9/2012 | Trivedi et al. | |
| 2013/0032421 A1 | 2/2013 | Bonne et al. | |
| 2013/0035821 A1 | 2/2013 | Bonne et al. | |
| 2013/0054128 A1 | 2/2013 | Moshchuk et al. | |
| 2013/0204676 A1 | 8/2013 | Hindi et al. | |
| 2013/0219294 A1 | 8/2013 | Goldman-Shenhar et al. | |
| 2014/0011522 A1 | 1/2014 | Lin et al. | |
| 2014/0335995 A1 | 11/2014 | Swales et al. | |
| 2015/0077270 A1 | 3/2015 | Rubin et al. | |
| 2015/0353082 A1 | 12/2015 | Lee et al. | |
| 2015/0353085 A1 | 12/2015 | Lee | |
| 2016/0102986 A1 | 4/2016 | Ma et al. | |
| 2016/0231124 A1 | 8/2016 | Nickolaou et al. | |
| 2016/0260328 A1 | 9/2016 | Mishra et al. | |
| 2016/0320194 A1 | 11/2016 | Liu et al. | |
| 2016/0320195 A1 | 11/2016 | Liu et al. | |
| 2016/0320198 A1 | 11/2016 | Liu et al. | |
| 2016/0321566 A1 | 11/2016 | Liu et al. | |
| 2016/0321771 A1 | 11/2016 | Yimin et al. | |
| 2017/0021830 A1 | 1/2017 | Feldman et al. | |
| 2017/0136916 A1 | 5/2017 | Heisel et al. | |
| 2017/0316684 A1 | 11/2017 | Jammoussi et al. | |
| 2018/0162379 A1* | 6/2018 | Mizuno | B60W 20/15 |
| 2018/0257660 B1 | 9/2018 | Faroog et al. | |
| 2018/0364700 A1 | 12/2018 | Liu et al. | |
| 2018/0374341 A1 | 12/2018 | Branson et al. | |
| 2019/0369626 A1 | 12/2019 | Lui et al. | |
| 2019/0378412 A1 | 12/2019 | Zhu | |
| 2020/0021226 A1 | 1/2020 | Welchko et al. | |

* cited by examiner

INTELLIGENT MOTOR SYSTEMS AND CONTROL LOGIC FOR CREATING HEAT WITH CONSTANT OFFSET TORQUE IN STATIONARY VEHICLES

INTRODUCTION

The present disclosure relates generally to traction motors of electric-drive vehicles. More specifically, aspects of this disclosure relate to motor control systems for producing waste heat while outputting a desired motor torque.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Active thermal management (ATM) systems for automotive powertrains employ a central vehicle controller or dedicated control module to regulate operation of a cooling circuit that distributes coolant, generally of oil, water, and/or antifreeze, through the heat-producing components of the powertrain. For standard ICE applications, a coolant pump propels cooling fluid — colloquially "engine coolant"— through coolant passages in the engine block, coolant channels in the transmission case, and hoses to an air-cooled radiator. For early generation hybrid and electric vehicles, the in-vehicle active thermal management system used multiple independently operated thermal subsystems for cooling discrete segments of the powertrain. Some hybrid electric vehicle ATM architectures, for example, use a dedicated coolant loop for the engine and transmission, a separate coolant loop for the electric motor(s) and power electronics modules, and another distinct coolant loop for regulating battery pack operating temperature. Electric-drive vehicle ATM's may also draw on heat-emitting powertrain components to provide thermal energy for heating the passenger compartment or for preconditioning the engine, motor(s), or battery pack during cold-start operations or for priming the battery pack for a recharge.

SUMMARY

Presented herein are intelligent motor systems with attendant control logic for selectively generating waste motor heat while holding an offset motor torque during stationary vehicle operation, methods for manufacturing and methods for operating such systems, and motor vehicles equipped with such systems. By way of example, there are disclosed motor control algorithms with configurable current trajectories to operate the motor and power inverter as electrothermal generators while maintaining an offset motor torque during stationary vehicle operations. In essence, the motor control system produces excess heat for a standing vehicle while concurrently restricting rotation of the motor's output shaft. A controlled offset torque counteracts unwanted jitters/oscillations at the motor shaft when the vehicle is stopped. The controlled current trajectory improves the distribution of current across the inverter switches, which maximizes heat generation for a given inverter current. Inverter losses may be output as high-quality heat that is directly applied to the cooling fluid while motor losses may be converted through a system heat exchanger. Heat quality during stationary vehicle operation may be further enhanced by optimizing the selected current level and PWM method and/or switching frequency ($F_{sw}$).

Attendant benefits for at least some of the disclosed concepts include motor control systems and algorithms that employ electrified powertrain components, such as the traction motor and power inverter module (PIM), as heat generators while operating at low noise, vibration, and harshness (NVH) levels for stationary vehicles. This, in turn, may allow for replacing or downsizing the vehicle's rechargeable energy storage system and/or active thermal management system with a concomitant reduction in vehicle weight and cost. Other attendant benefits may include motor control systems and algorithms that realize increased motor-generated heat output with better thermal distribution on the inverter switches. In addition to improved thermal management and vehicle weight/cost savings, disclosed concepts may help to increase driving range, fuel economy, and powertrain performance for electric-drive vehicles.

Aspects of this disclosure are directed to motor control systems, system control logic, and closed-loop feedback control techniques for producing motor heat while maintaining a desired offset motor torque during stationary vehicle operations. In an example, a method is presented for operating a polyphase AC motor of a motor vehicle using a traction power inverter module. This representative method includes, in any order and in any combination with any of the above and below disclosed options and features: receiving, e.g., via a resident or remote vehicle controller from a driver through a powertrain control module (PCM) or an electronic brake control module (EBCM), a mode request to operate the motor vehicle in a stationary mode; receiving, e.g., via the vehicle controller from an electronic telematics unit controller (ETUC), a temperature request including a corresponding waste motor heat to be generated by the AC motor during stationary vehicle operation; determining, e.g., via the vehicle controller using a motor-calibrated lookup table, an offset motor torque to generate the waste motor heat while retaining the AC motor's output member (e.g., rotor shaft) at a select output position during stationary vehicle operation; determining, e.g., via the vehicle controller from cache memory, a DQ transform model of the AC motor; selecting, e.g., via the vehicle controller based on the offset motor torque, first and second dq current trajectories, each of which is located in a respective dq operating quadrant of the DQ transform model; and transmitting, e.g., via the vehicle controller to the PIM connected to a traction battery pack, one or more command signals to transmit electrical current to the AC motor based on the first and second dq current trajectories.

Additional aspects of this disclosure are directed to intelligent motor vehicles using select electrified powertrain components as electrothermal heat generators for active thermal management during stationary vehicle operations. As used herein, the terms "vehicle" and "motor vehicle" may be used interchangeably and synonymously to include any relevant vehicle platform, such as passenger vehicles (ICE, REV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with a passenger compartment, multiple drive wheels rotatably mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to propel the vehicle. A rechargeable traction battery pack is mounted onto the vehicle body and operable to power the traction motor(s) using a traction power inverter module (TPIM).

Continuing with the discussion of the preceding example, the vehicle employs a vehicle controller and power inverter to govern operation of the motor and battery pack. The controller is programmed to receive a mode request to operate the vehicle in a stationary mode and concurrently receive a temperature request with an amount of waste motor heat to be generated by the AC motor during stationary vehicle operation. An offset motor torque is derived for generating the desired waste motor heat while maintaining the motor's output member at a select output position during stationary vehicle operation. Using the offset motor torque and a DQ transform model of the AC motor, the controller selects at least two dq current trajectories that are respectively located in distinct dq operating quadrants of the DQ transform model. Based at least in part these select dq current trajectories, the controller commands the PIM to transmit electrical current to the AC motor, e.g., such that the motor generates waste heat for active thermal management without discernable movement of the vehicle.

Aspects of this disclosure are also directed to computer-readable media (CRM) for generating waste motor heat while maintaining a desired offset motor torque during stationary vehicle operations. In an example, non-transitory CRM stores instructions executable by one or more processors of a vehicle controller, such as a dedicated motor control module. These instructions, when executed by the processor(s), cause the vehicle controller to perform operations, including: receiving a mode request to operate the motor vehicle in a stationary mode; receiving a temperature request including a waste motor heat to be generated by the AC motor during operation of the motor vehicle in the stationary mode; determining an offset motor torque to generate the waste motor heat and hold a motor output member of the AC motor at a select output position during operation of the motor vehicle in the stationary mode; determining a DQ transform model of the AC motor; selecting first and second dq current trajectories respectively located in first and second dq operating quadrants of the DQ transform model based on the offset motor torque; and transmitting a command signal to the PIM to transmit electrical current to the AC motor based on the first and second dq current trajectories.

For any of the disclosed systems, methods, and vehicles, selecting a dq current trajectory may include determining a maximum current magnitude for the AC motor, and calculating the dq current trajectories as projections in a plane of the DQ transform model based on the maximum current magnitude. In this instance, determining the maximum current magnitude may include receiving operating temperature data for the AC motor and/or PIM, and predicting the maximum current magnitude as a function of the motor/PIM operating temperature data and the select output position of the motor output member. Each dq current trajectory may be respectively calculated as $I_{dqn} = (I_{dn}, I_{qn})$, where n=2 2, 3 . . . N, and $I_d = -I_{ss}*\sin(\beta)$, $I_q = I_{ss}*\cos(\beta)$, and $T_q = 1.5*PP*(\lambda_d I_q - \lambda_q I_d)$. For this example, Tq is the offset motor torque; $\beta$ is a current angle between the motor's electromagnetic rotor and stator elements; $I_d$ is a d-axis current; $I_q$ is a q-axis current; PP is a number of pole pairs in the AC motor; $\lambda_d$ is a d-axis flux linkage; $\lambda_q$ is a q-axis flux linkage; and $I_{ss}$ is a current magnitude.

For any of the disclosed systems, methods, and vehicles, the vehicle controller may be programmed to generate DQ reference frame voltage command signals based on the select dq current trajectories and transform the DQ reference frame voltage command signals to multiphase voltage command signals. Based on these multiphase voltage command signals, the controller may derive a set of pulse-width modulation (PWM) control commands, which are included command signal(s) sent to the PIM. In this instance, generating DQ reference frame voltage command signals may include the controller determining reference frame feedback current signals based on measured three-phase reference stator currents fed back from the AC motor, and then calculating a dq current trajectory error as a mathematical summation of the dq current trajectories and the reference frame feedback current signals. DQ reference frame voltage command signals are then calculated as time functions of steady state operation of the AC motor based on the dq current trajectory. Transforming the DQ reference frame voltage command signals to multiphase voltage command signals may include an inverse transformation from a rotating orthogonal frame of the DQ transform model to a static three-phase reference frame. As yet a further option, determining PWM control commands may include generating multiple switching vector signals based on a duty cycle associated with a predefined PWM period.

For any of the disclosed systems, methods, and vehicles, the command signal(s) transmitted to the PIM may include a PWM switching frequency that is derived by oscillating back-and-forth between the first and second dq current trajectories and the first and second dq operating quadrants of the DQ transform model. Optionally, the vehicle controller may be programmed to receive measured three-phase reference stator currents fed back from the AC motor after transmitting the command signal to the PIM, and transform the three-phase reference stator currents to DC reference frame voltage command signals. Transforming the three-phase reference stator currents to the DQ reference frame voltage command signals may include an inverse transformation from a static three-phase reference frame to a rotating orthogonal frame of the DQ transform model.

For any of the disclosed systems, methods, and vehicles, the motor output member includes a rotor shaft drivingly coupled to a rotor of the AC motor. In this instance, the vehicle controller may be programmed to receive the select output position from an electronic position sensor attached to the rotor shaft. As yet a further option, the vehicle controller may be programmed to determine an angular velocity of the AC motor's output member as a derivative function of the select output position with respect to time. Angular velocity of the AC motor's output member may be employed by a command generation model and a current regulator module of the motor control system to govern operation of the motor when the vehicle is not being operated in the stationary mode.

The above Summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
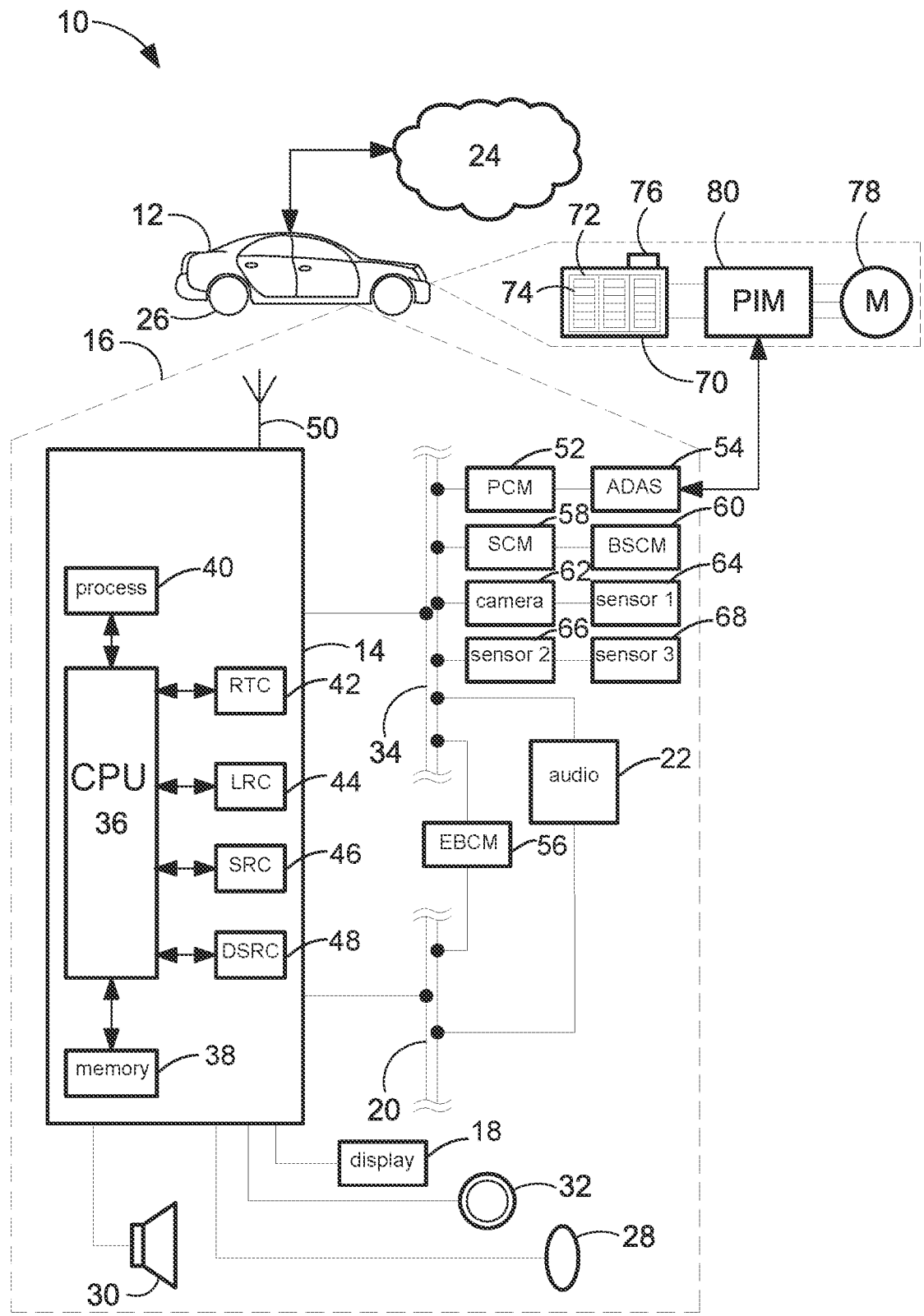
FIG. 1 is a partially schematic, side-view illustration of a representative motor vehicle with an electrified powertrain, a traction battery pack, and a network of in-vehicle controllers, sensing devices, and communication devices for intelligent motor control and active thermal management during stationary vehicle operation according to aspects of the disclosed concepts.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style, electric-drive passenger vehicle. The illustrated automobile 10—also referred to herein as "motor vehicle" or "vehicle" for short—is merely an exemplary application with which novel aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain architectures, incorporated into any logically relevant type of motor vehicle, and utilized for both automotive and non-automotive applications alike. Moreover, only select components of the motor vehicles and motor control systems are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunication and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, pedals, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28 provides a vehicle occupant with means to input verbal or other auditory commands; the vehicle 10 may be equipped with an embedded voice-processing unit utilizing audio filtering, editing, and analysis modules. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. Other appropriate communication interfaces may include those that conform with ISO, SAE, and/or IEEE standards and specifications. The network connection interface 34 enables the vehicle hardware 16 to send and receive signals with one another and with various systems and subsystems both onboard the vehicle body 12 and off-board the vehicle body 12. This allows the vehicle 10 to perform assorted vehicle functions, such as modulating powertrain output, governing operation of the vehicle's transmission, activating the friction and regenerative brake systems, controlling vehicle steering, regulating charge and discharge of the vehicle's battery pack(s), and other automated functions. For instance, telematics unit 14 receives and transmits signals and data to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, flash memory, semiconductor memory (e.g., various types of RAM or ROM), etc.

Long-range vehicle communication capabilities with remote, off-board devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components or, optionally, may include additional components and functionality as desired for a particular end use. The communications devices described above may provision data exchanges as part of a periodic broadcast in a vehicle-to-vehicle (V2V) communication system or a vehicle-to-everything (V2X) communication system, e.g., Vehicle-to-Infrastructure (V21), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

To propel the motor vehicle 10, an electrified powertrain is operable to generate and deliver tractive torque to one or more of the vehicle's drive wheels 26. The powertrain is generally represented in FIG. 1 by a rechargeable energy storage system (RES S), which may be in the nature of a chassis-mounted traction battery pack 70, that is operatively connected to an electric traction motor 78. The traction battery pack 70 is generally composed of one or more battery modules 72 each having a stack of battery cells 74, such as lithium ion, lithium polymer, or nickel metal hydride battery cells of the pouch, can, or prismatic type. One or more electric machines, such as traction motor/generator (M) units 78, draw electrical power from and, optionally, deliver electrical power to the battery pack 70. A power inverter module (PIM) 80 electrically connects the battery pack 70 to the motor/generator unit(s) 78 and modulates the transfer of electrical current therebetween. Disclosed concepts are similarly applicable to HEV and ICE-based powertrains.

The battery pack 70 may be configured such that module management, cell sensing, and module-to-module or module-to-host communication functionality is integrated directly into each battery module 72 and performed wirelessly via a wireless-enabled cell monitoring unit (CMU) 76. The CMU 76 may be a microcontroller-based, printed circuit board (PCB)-mounted sensor array. Each CMU 76 may have a GPS transceiver and RF capabilities and may be packaged on or in a battery module housing. The battery module cells 74, CMU 76, housing, coolant lines, busbars, etc., collectively define the cell module assembly.

Figure 2:
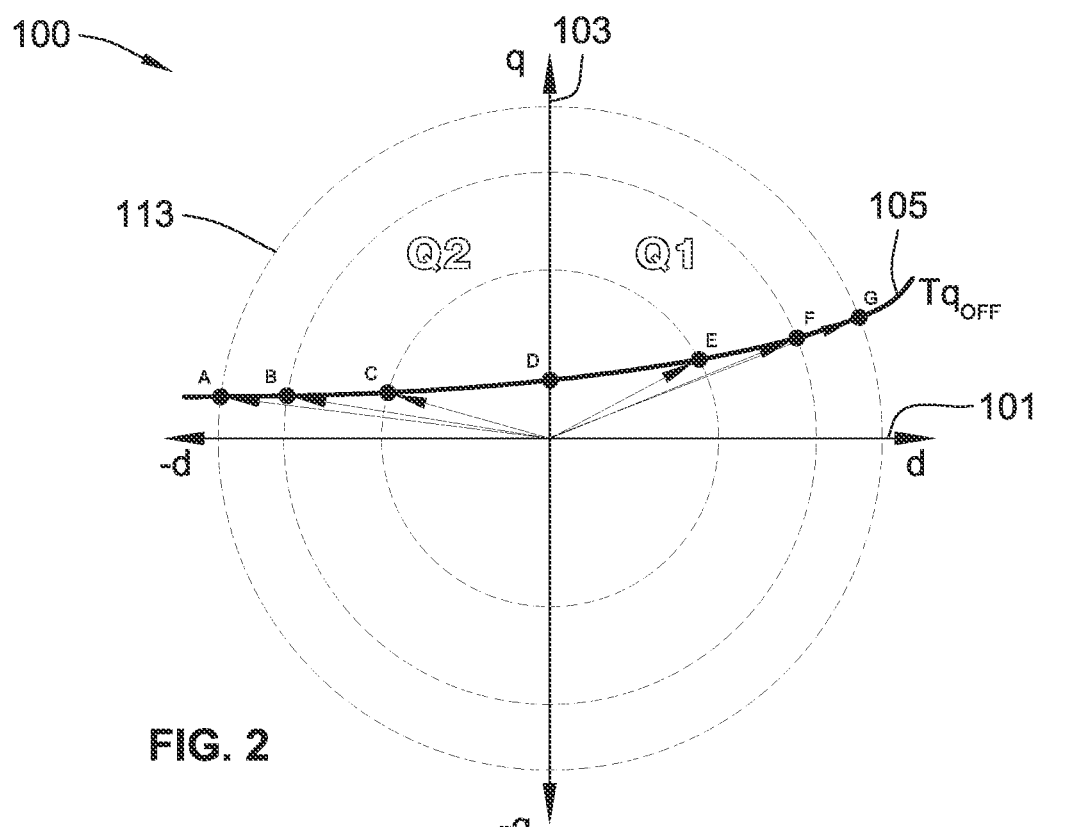
FIG. 2 is a representative DQ reference frame plot that mathematically models an input current for a polyphase traction motor in accord with aspects of this disclosure.

During operation of a motor vehicle, such as electric-drive vehicle 10 of FIG. 1, controller-based management of a polyphase AC motor, such as electric traction motor 78, may implement direct-quadrature (DQ) transformations (abc-dq), an example of which is shown in FIG. 2 at 100, to simplify analysis and control of the stator-and-rotor coupled, multiphase circuit. A direct-quadrature model may be employed to mathematically describe the behavior of the induction motor in both stationary and synchronous reference frames. The three AC quantities—stator current $i_s=[i_{as}, i_{bs}, i_{cs}]$ and rotor currents $i_r=[i_{ar}, i_{br}, i_{cr}]$, are transformed to two DC quantities—$i_s=[i_{ds}, i_{qs}]$ and $i_r=[i_{dr}, i_{qr}]$—for ease of calculations and associated control in the two-dimensional dq reference frame. The transform is used to rotate the reference frames of AC waveforms such that they become DC signals. A motor current space vector can be defined in a dq reference frame 100 with orthogonal components along a horizontal direct axis (d-axis) 101 and a vertical quadrature axis (q-axis) 103 such that a field flux linkage is aligned along the d-axis and a torque component is aligned along the q-axis. After execution of calculations, an inverse transformation (dq-abc) is executed to derive control commands for the power inverter module to operate the motor. Flux commands are used to determine a direct-current portion of control in the dq reference frame and torque commands correspond to the quadrature-current portion of control in the dq reference frame. Simplified calculations may then be carried out on these DC quantities before performing the inverse transform to recover the actual three-phase AC results.

For stationary vehicle operation, the DQ reference frame current vector ($I_{dq}$) may move sequentially from dq current trajectory A to B to C to D to E to F and to G along an offset motor torque line 105 of FIG. 2, and then back from G to F to E to D to C to B and to A. As another option, the ($I_{dq}$) current vector may lie on point A for a first predefined period of time, quickly transition to point E, lie on point E for a second predefined period of time, and then quickly transition back to point A. The vector may oscillate back-and-forth between points A and E—two different current magnitudes—while holding steady the offset motor torque 105. An offset motor torque ($Tq_{off}$) may be a configurable value that depends, for example, on a desired NVH level/limit, motor/drive unit operating parameters/limits, vehicle topology, etc. Typically, an offset torque is a relatively small value when compared to an AC motor's maximum torque capacity (e.g., $Tq_{off}=\sim5$ Nm; $Tq_{max}=\sim400$ Nm).

The d-axis current value ($I_d$) and the q-axis current value ($I_q$) for each dq current trajectory current values ($I_{dq}$) are projections in a plane of the DQ transform model that may be respectively calculated as $I_{dqn}=(I_{dn}, I_{qn})$ (n=1, 2, 3 . . . ), where:

$$I_d = -I_{ss}*\sin(\beta)$$

$$I_q = I_{ss}*\cos(\beta)$$

$$T_q = 1.5*PP*(\lambda_d I_q - \lambda_q I_d)$$

Here, Tq is the offset motor torque; β is a current angle; $I_d$ is a d-axis current; $I_q$ is a q-axis current; PP is a number of pole pairs in the AC motor; $\lambda_d$ is a d-axis flux linkage; $\lambda_q$ is a q-axis flux linkage; and $I_{ss}$ is a current magnitude. Additional information regarding dq reference frames for modeling and control of AC motors can be found, for example, in U.S. patent application Ser. No. 17/512,074 A1, to Vinod C. Peddi, et al., and entitled "Method and Apparatus for Operating an Electric Drive Unit", which is incorporated herein by reference in its entirety and for all purposes.

Figure 3:
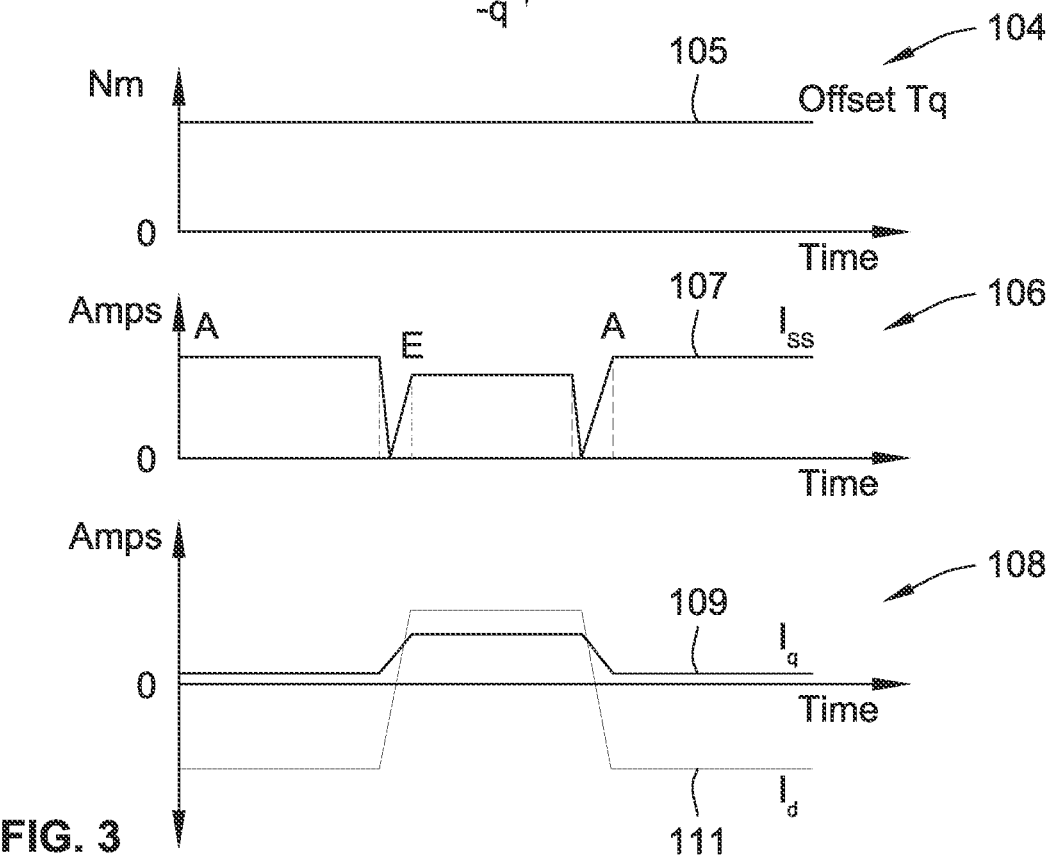
FIG. 3 illustrates three representative time-domain plots of the DQ reference frame plot of FIG. 2 showing an offset motor torque being held constant while the d-axis and q-axis current vectors $I_d$ and $I_q$ oscillate between two motor quadrants and the current magnitude $I_{ss}$ remains below the motor's maximum current magnitude at each time of transition in the dq-plane.

FIG. 3 presents three representative time-domain plots that reflect operation of a polyphase AC motor using the DQ reference frame plot 100 of FIG. 2, namely a plot of electromagnetic motor torque output 104 (Newton-meter (Nm)) versus time (t), a plot of input motor current magnitude 106 (amperes (A)) versus time (t), and a plot of DQ reference frame current vector ($I_{dq}$) 108 (amperes (A)) versus time (t). The first time-domain plot of motor torque output 104 graphically illustrates a desired offset motor torque 105 that is maintained substantially constant for a duration of stationary vehicle operation while achieving a desired waste heat that is output by the AC motor. When juxtaposed with the time-domain plots of input motor current 106 and DQ reference frame current 108, it can be seen that this desired offset motor torque 105 is held steady while a motor current magnitude ($I_{ss}$) 107 experiences only a slight variation during transitions between reference frame quadrants without exceeding a maximum current magnitude ($I_{ss\text{-}heat}$). At the same time, the ($I_{dq}$) current vector is shown oscillating back-and-forth between a q-axis current vector ($I_q$) 109 and a d-axis current vector ($I_d$) 111 and their associated motor quadrants Q1 and Q2 (FIG. 2) of the DQ reference frame plot 100. An Idq current vector may remain on a first value for a first duration of time (e.g., point A for ~1.0-2.0 seconds), quickly transition (e.g., point A to point E within ~3.5 milliseconds), and remain on a second value for a second duration of time (e.g., point E for ~1.5-2.5 seconds).

Figure 4:
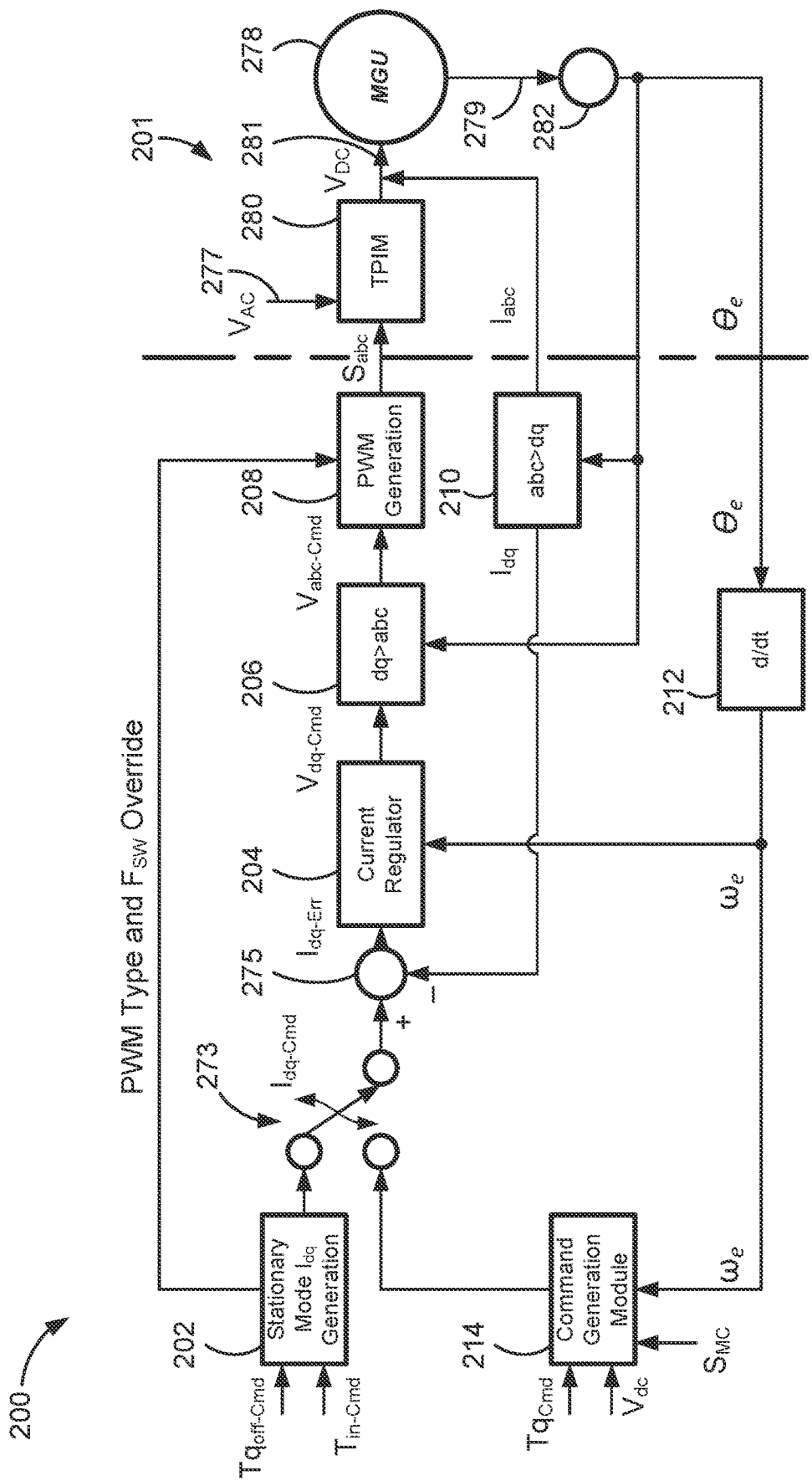
FIG. 4 is a block diagram schematically illustrating a representative motor control system for selective generation of waste motor heat and offset motor torque control during stationary vehicle operations in accord with aspects of the disclosed concepts.

Turning next to FIG. 4, there is shown a representative motor control system 200 that provisions active thermal management with controlled waste heat generation by select components of an electrified powertrain 201 during stationary vehicle operation. In accord with the illustrated example, the motor control system 200 may be embodied as a dedicated motor controller or control module, a network of controllers/modules, or interrelated software modules programmed into a centralized vehicle controller, such as CPU 36 of FIG. 1. As noted above in the discussion of FIG. 1, the electrified powertrain 201 of FIG. 4 may employ one or more polyphase AC motors or motor generator units (MGU) 278, such as traction motor 78, that is/are electrically connected via one or more traction power inverter modules (TPIM) 280, such as power inverter 80, to a rechargeable energy storage system, such as traction battery pack 70. For hybrid-electric applications, the AC motor(s) 278 would selectively operate alone and in cooperation with an internal combustion engine (ICE) assembly (not shown).

Using a field-oriented control (FOC) type of variable-frequency drive (VFD) stator current control, for example, the motor control system 200 of FIG. 4 governs the AC motor 278 via the TPIM 280. As shown, the TPIM 280 is coupled to the motor's three-phase (abc) windings so that a DC voltage ($V_{DC}$) output from the RESS, e.g., across a high-voltage (HV) DC bus 277, is converted to AC voltage ($V_{AC}$) by adjusting current commands to the TPIM 280. While applicable to a variety of different motor architectures operating in assorted multiphase configurations, disclosed features may be particularly suitable for applications in which the AC motor 278 is a three-phase, permanent-magnet (PM) synchronous motor.

For a three-phase PM motor configuration, the AC motor 278 may be coupled to the TPIM 280 via three inverter poles 281; in so doing, the motor 278 generates mechanical power as the product of torque and speed based on three-phase current ($I_{abc}$) signals received from the TPIM 280. A real-time angular position $\Theta_e$ of a motor output member, such as rotor shaft 279, may be monitored using an electronic output position sensor 282 coupled to the shaft 279. In addition, a derivative function module 212, which may be in the nature of a virtual software observer, may calculate a derivative function of the motor output member's angular position ($\Theta_e$) with respect to time to derive a real-time angular velocity ($\omega_e$) that is fed to a Command Generation module 214. To this end, the motor control system 200 of FIG. 4 may include a Stationary Mode Idq Generation module 202, a Current Regulator module 204, a Rotating Orthogonal (dq) Reference Frame to static three-phase (abc) reference frame (dq→abc) transformation module 206, a Pulse Width Modulation (PWM) Generation module 208, and a Static Three-Phase (abc) Reference Frame to rotating orthogonal (dq) reference frame (abc→dq) transformation module 210, a Derivative Function (d/dt) module 212, and a Command Generation module 214.

Command Generation module 214 of FIG. 4 receives assorted inputs from a variety of resident and/or remote systems and subsystems in order to carry out motor control during dynamic vehicle operation. In accord with the illustrated example, the Command Generation module 214 receives and processes at least a torque command signal ($Tq_{cmd}$), a DC input voltage ($V_{dc}$), and a motor output angular velocity ($\omega_e$), which may be supplemented with other system parameters. Using these inputs, the Command Generation module 214 generates d-axis and q-axis current trajectory coordinates—represented in FIG. 4 as a synchronous DQ reference frame current trajectory command ($I_{dq\text{-}cmd}$)—that will cause the AC motor 278 to produce the commanded torque ($Tq_{cmd}$) at the desired angular velocity ($\omega_e$). Moreover, the DQ reference frame current trajectories command ($I_{dq\text{-}cmd}$) is effective to cause the AC motor 278 to generate motor heat that may be utilized for active thermal management and/or selective heating of the passenger compartment. Any such heat generation may depend upon a mode control signal ($S_{MC}$) from a vehicle mode management module, which may receive a mode request and a heat level request from a vehicle occupant or a vehicle controller/module. The Command Generation module 214 may use these inputs to map torque command signals and mode control signals to a synchronous reference frame current trajectory to effect desired torque and heat objectives.

Abc-to-dq to transformation utilizes measured three-phase stationary reference frame stator current ($I_{abc}$) signals that are fed back from the AC motor 278 for closed-loop control. The Static Three-Phase (abc→dq) Reference Frame transformation module 210 uses these three-phase stationary reference frame stator currents ($I_{abc}$) to perform an abc-to-dq reference frame transformation to transform the three-phase stationary reference frame stator currents ($I_{abc}$) into synchronous reference frame feedback current signals ($I_{dq}$). The process of stationary-to-synchronous conversion—transformation from a two-axis orthogonal stationary reference frame to a three-phase stationary reference frame—may employ a Park transformation, a Clarke transformation, a Park and Clarke transformation, or similarly suitable technique to transform a set of dq0 rotating reference frame signals to a three-phase signal.

Using closed-loop feedback control, a summing node 275 feeds a dq current trajectory error ($I_{dq\text{-}err}$) to the Current Regulator module 204. This dq current trajectory error ($I_{dq\text{-}err}$) may be calculated as a mathematical difference between the synchronous DQ reference frame current trajectory ($I_{dq\text{-}cmd}$) signals, which are output from Generation module 202 or 214, and the synchronous DQ reference frame feedback current ($I_{dq}$) signals, which are output from the Static Three-Phase Reference Frame module 210, to generate synchronous DQ reference frame voltage command ($V_{dq\text{-}cmd}$) signals. Synchronous DQ reference frame voltage command ($V_{dq\text{-}cmd}$) signals are DC commands that have a constant value as a function of time for steady state operation. Because the current commands are DC signals in the synchronous reference frame, they are easier to model and analyze when compared to AC stationary reference frame current commands. The process of DC current-to-voltage conversion by Current Regulator module 204 may be implemented as a proportional-integral (PI) controller, an Op-amp based converter, or other similarly suitable techniques.

With continuing reference to FIG. 4, the Rotating Orthogonal (dq) Reference Frame transformation module 206 receives the synchronous reference frame voltage command signals ($V_{dq\text{-}cmd}$) from the Current Regulator module 206 and, based on these signals, generates stationary multiphase reference frame voltage command ($V_{abc\text{-}cmd}$) signals (also referred to as "phase voltage signals" or "phase voltage command signals"). These phase voltage signals are sent to the PWM Generation module 208. The dq-to-abc transformation may be performed using an inverse Park transformation, an inverse Clarke transformation, an inverse Park and Clarke transformation, or other available and appropriate transformation technique.

PWM Generation module 208 is communicatively coupled to TPIM 280 and operable for the control of pulse width modulation of the phase voltage command ($V_{abc\text{-}cmd}$) signals output by the Current Regulator module 206. A set of switching vector signals ($S_{abc}$) are generated by the PWM Generation module 208 based on duty cycle waveforms that are internally generated by the PWM Generation module 208 to have a particular duty cycle during each PWM period. The PWM Generation module 208 modifies the phase voltage command ($V_{abc\text{-}cmd}$) signals based on the duty cycle waveforms and the DC input voltage ($V_{dc}$) to generate the switching vector signals ($S_{abc}$), which it provides to the TPIM 280. The particular modulation algorithm implemented in the PWM Generation module 208 may include continuous PWM (CPWM) techniques (e.g., Space Vector PWM (SVPWM) techniques), discontinuous PWM (DPWM) techniques, and other available signal modulation algorithms to create AC waveforms that drive the AC motor 278 at varying angular velocities based on the DC input voltage ($V_{dc}$). For at least some applications, it may be desirable to employ CPWM techniques with higher switching losses and, thus, larger heat generation when compared to DPWM.

The switching frequency implemented in the PWM Generation module 208 may be fixed or variable in accordance with various control objectives and efficiency tradeoffs. For example, higher switching frequencies may result in higher switching losses and, thus, greater heat generation in the IGBTs or other power switches of the TPIM 280. While it may be generally desirable to minimize switching losses, e.g., during normal dynamic vehicle operation, higher switching frequencies may advantageously be employed where heat generation is a desired control objective, e.g., during active-heating stationary vehicle operation. In this regard, baseline operation of the TPIM 280 via PWM Generation module 208 may be at a relatively low switching frequency (e.g., 10-12 kHz) with DPWM, especially when overall efficiency is a controlling objective. However, in instances where additional heat generation is a desired objective, higher switching frequencies (e.g., 20 kHz or higher), an alternative PWM modulation technique, such as SVPWM, may be employed.

Switching vector signals ($S_{abc}$) control the switching states of switches in the TPIM 280 to generate the respective phase voltages at each phase winding of the AC motor 278. The switching vector signals ($S_{abc}$) may be embodied as PWM waveforms that have a predefined duty cycle during each PWM period, which is determined by the duty cycle waveforms that are internally generated at the PWM Generation module 208. The AC motor 278 receives the three-phase voltage signals generated by the TPIM 280 and generates a machine output at the commanded torque ($Tq_{cmd}$).

Stationary Mode $I_{dq}$ Generation module 202 of FIG. 4 receives assorted inputs from a variety of vehicle systems and subsystems in order to carry out motor control during static vehicle operation (e.g., key-on event, parked vehicle charging, traffic sign/light stop, etc.). By way of non-limiting example, the intelligent motor control system 200 may receive a mode request to operate a host vehicle in a stationary mode from a human or controller-based driver through an electronic gear shifter (e.g., PRNDL knob), a powertrain control module (PCM), and/or an electronic brake control module (EBCM). Stationary Mode $I_{dq}$ Generation module 202 may be engaged when the vehicle is at a standstill and heat is requested; a control switch 273 responsively disengages the Command Generation module 214 and concomitantly engages Stationary Mode $I_{dq}$ Generation module 202, which is explained in further detail below in the discussion of FIGS. 5 and 6. At the same time, the Stationary Mode Tag Generation module 202 may transmit a PWM type and PWM switching frequency $F_{SW}$ override 225 (FIG. 5) to the PWM Generation module 208.

In accord with the illustrated example, Stationary Mode $I_{dq}$ Generation module 202 receives and processes a motor offset torque command ($Tq_{cmd}$), a DC input voltage ($V_{dc}$), a thermal input command ($T_{in\text{-}cmd}$), and a motor output angular position ($\Theta_e$), which may be supplemented with other system parameters. Using these inputs, the Generation module 202 identifies a synchronous DQ reference frame current trajectory command ($I_{dq\text{-}cmd}$) with corresponding sets of d-axis and q-axis current trajectory coordinates that will cause the AC motor 278 to produce the requested offset torque ($Tq_{off\text{-}cmd}$) while maintaining the desired angular position ($\Theta_e$). Moreover, the DQ reference frame current trajectories command ($I_{dq\text{-}cmd}$) is effective to cause the AC motor 278 to generate motor heat that may be utilized for active thermal management and/or selective heating of the passenger compartment while the vehicle is not moving. The Generation module 202 may use these inputs to map torque command signals and mode control signals to a synchronous reference frame current trajectory to effect desired torque and heat objectives.

Figure 5:
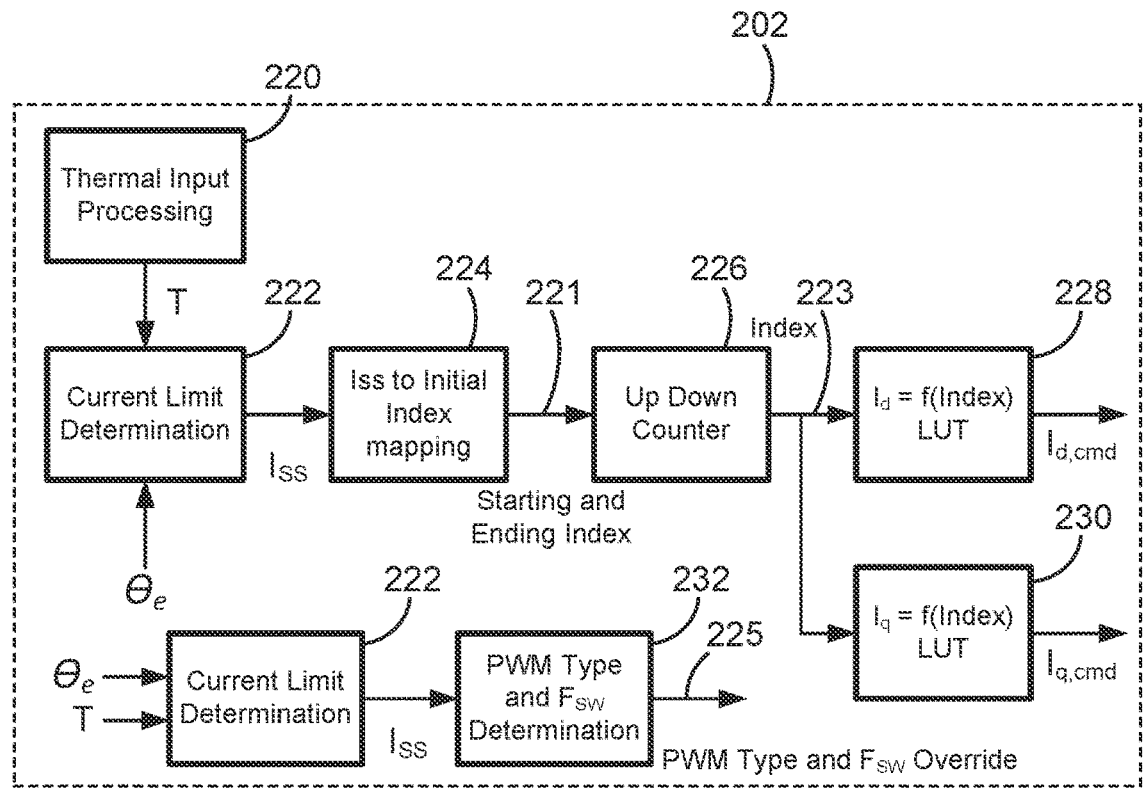
FIG. 5 is a block diagram schematically illustrating the representative Stationary Mode $I_{dq}$ Generation module of FIG. 4.

Turning next to FIG. 5, when the Stationary Mode $I_{dq}$ Generation module 202 of FIG. 4 is engaged during stationary vehicle operation, a thermal input T signal is received via a Thermal Input Processing module 220. This thermal input T signal may be indicative of temperature measurements for select in-vehicle devices that are being monitored using sensors or observers to provide closed-loop feedback control for adjusting current magnitudes and PWM types/switching frequencies. Processing of a thermal input T signal may be based on in-system temperature sensors or virtual estimators of real-time temperatures for active components, such as the inverter's IGBT/Diodes and the motor's stator and rotor, and/or passive components, such as bus bars, DC bus capacitors, etc. Thermal input T signals are distinct from heat request signals output by a supervisory controller that allows the system to engage and provide heat with the host vehicle set in stationary mode. The processed thermal request (T) is passed to a Current Limit Determination module 222. Using the processed thermal request (T) and the motor output member's angular position ($\Theta_e$), the Current Limit Determination module 222 dynamically estimates a predicted current limit, for example, based on knowledge of active/passive device temperature ratings.

Current Limit Determination module 222 outputs a current magnitude ($I_{ss}$) to an Initial Index Mapping module 224. The Initial Index Mapping module 224 of FIG. 5 implements the current trajectories in dq reference frame 100 of FIG. 1 to derive a starting index and an ending index. Initial Index Mapping module 224 may be programmed into a look up table and indexed, collectively 221 in FIG. 5. For example, point A of FIG. 1 corresponds to an outer current limit ring 113; in this instance, an index value 223 may be 1. The system may gradually "walk" on the trajectory to point G, which is also on the outer current limit ring 113 and may be the last index corresponding to offset motor torque 105. The entire trajectory may be retrieved from the lookup table by counting up or down using a counter. With each current trajectory for each offset torque of FIG. 1 programmed into a look up table (LuT) and indexed, an Up/Down Counter module 226 counts the index up or down in order to walk through the current trajectory, and outputs a corresponding index designator.

Stationary Mode Idq Generation module 202 utilizes the index designator to then identify a d-axis current command ($I_{d\text{-}cmd}$) value and a q-axis current command ($I_{q\text{-}cmd}$) value for a synchronous DQ reference frame current trajectory command ($I_{dq\text{-}cmd}$). In FIG. 5, a set of d-axis current Id values and a set of q-axis current Iq may each be stored as a preprogrammed lookup table 228 and 230, respectively, with indexed commands that capture the trajectory of the current. The d-axis current command ($I_{d\text{-}cmd}$) may be retrieved as $I_d$=f(index)LUT, whereas the q-axis current command ($I_{q\text{-}cmd}$) may be retrieved as $I_q$=f(index)LUT.

As yet a further option, the Stationary Mode Idq Generation module 202 may employ a PWM type and $F_{SW}$ Determination module 232 that receives the current magnitude ($I_{ss}$) output from the Current Limit Determination module 222 and, from the current magnitude, determines an optimal PWM type and PWM switching frequency for generating waste motor heat while holding an offset motor torque during stationary vehicle operation. Based on the thermal information processed by Thermal Input Processing module 220 and the available current for device use, a desired PWM type and a desired PWM switching frequency can be dynamically adjusted. By way of non-limiting example, when the select heat-generating devices are cooler and the current limit is higher, the system may employ a higher switching frequency (e.g., $F_{SW}$=~20 Khz to 30 Khz) and SVPWM type modulation. As the select heat-generating devices are hotter, the current limit may be adjusted while reducing the switching frequency (e.g., $F_{SW}$=10 Khz) and operate with DPWM.

Figure 6:
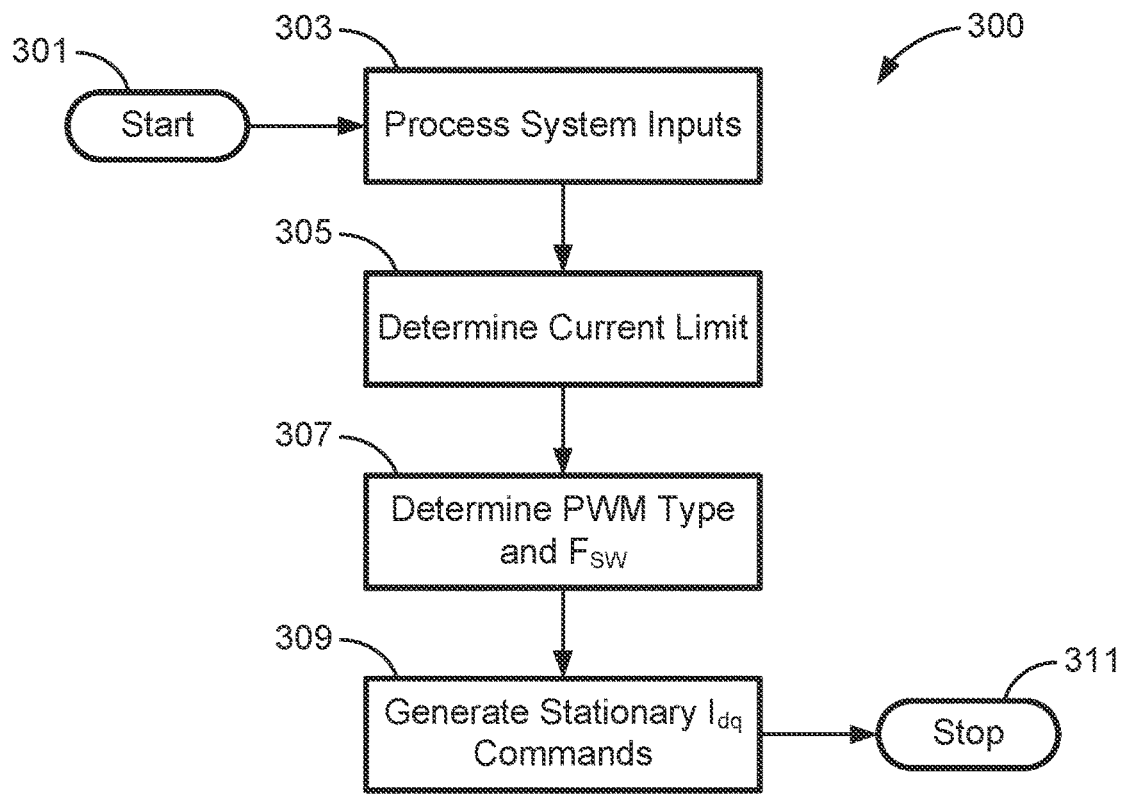
FIG. 6 is a flowchart illustrating a representative motor control algorithm for operating an electric traction motor as a heat generator for active thermal management of a standing vehicle, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 6, an improved method or control strategy for operating an electric traction motor, such as motors 78 and 278 of FIGS. 1 and 4, as a heat generator for active thermal management of a standing vehicle, such as vehicle 10 of FIG. 1, is generally described at 300 in accordance with aspects of the present disclosure. Some or all of the operations illustrated in FIG. 6, and described in further detail below, may be representative of algorithms that correspond to processor-executable instructions that are stored, for example, in main or auxiliary or remote memory (e.g., memory device 38 of FIG. 1), and executed, for example, by an electronic controller, processing unit, logic circuit, or other module or device or network of modules/devices (e.g., CPU 36 and/or host computing service 24), to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 300 begins at START terminal block 301 with memory-stored, processor-executable instructions for a programmable controller or control module or similarly suitable processor to call up an initialization procedure for a motor control protocol. This routine may be executed in real-time, near real-time, continuously, systematically, sporadically, and/or at regular intervals, for example, each 10 or 100 milliseconds during normal and ongoing operation of the motor vehicle 10. As yet another option, terminal block 301 may initialize responsive to a user command prompt, a resident vehicle controller prompt, or a broadcast prompt signal received from an "off-board" centralized vehicle services system (e.g., host computing service 24). Upon completion of the control operations presented in FIG. 6, the method 300 may advance to STOP terminal blocks 311 and temporarily terminate or, optionally, may loop back to terminal block 301 and run in a continuous loop.

Method 300 advances from START terminal block 301 to System Input Process block 303 to process a set of system inputs. These system inputs may include any of the related options described above with respect to FIGS. 1-5. In a more specific yet non-limiting example, the method 300 may processes a thermal input T, a heat request (e.g., thermal input command ($T_{in\text{-}cmd}$)), a torque offset request (e.g., motor offset torque command ($Tq_{cmd}$)), a stationary vehicle operating mode request (e.g., mode control signal ($S_{MC}$)), a desired rotor position (e.g., motor output angular position ($\Theta_e$)), or any combination of select inputs. Using these processed inputs, method 300 of FIG. 6 estimates a predicted current limit at Current Limit Determination block 305, which may be similar in operation to the Current Limit Determination module 222 of FIG. 5.

Upon determination of a current limit, method 300 determines an optimal PWM type and PWM switching frequency, as indicated by PWM Type and $F_{SW}$ Determination block 307. From there, a set of d-axis and q-axis current values for a DQ reference frame current vector ($I_{dq}$) is derived at Stationary Idq Commands Generation block 309. Process blocks 307 and 309 may be similar in operation to PWM type and $F_{SW}$ Determination module 232 and Stationary Mode Idq Generation module 202, respectively.

Some attendant advantages of disclosed concepts include a configurable current trajectory in the dq plane that enables operating an AC motor with an offset torque during stationary vehicle operation with better thermal distribution across an inverter's switching devices. A configurable current amplitude in each motor quadrant may provision improved heat generation and thermal distribution for the electrothermal generators. Moreover, a configurable current limit as a function of time enables rapid heat generation within the electrified powertrain. A configurable current limit as a function of rotor position offers improved thermal distribution on the inverter devices. Additionally, a configurable torque offset helps to retain the motor's shaft at a predefined position for increased NVH mitigation. Lastly, adjustable PWM types and adjustable PWM switching frequencies may help to optimize heat generation, e.g., for active thermal management.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating an alternating current (AC) motor of a motor vehicle with a power inverter module (PIM), the method comprising:
receiving, via a vehicle controller, a mode request to operate the motor vehicle in a stationary mode;
receiving, via the vehicle controller, a temperature request including a waste motor heat to be generated by the AC motor during operation of the motor vehicle in the stationary mode;
determining, via the vehicle controller, an offset motor torque to generate the waste motor heat and hold a motor output member of the AC motor at a select output position during operation of the motor vehicle in the stationary mode;
determining a direct-quadrature (DQ) transform model of the AC motor;
selecting, via the vehicle controller based on the offset motor torque, first and second dq current trajectories respectively located in distinct first and second dq operating quadrants of the DQ transform model; and
transmitting, via the vehicle controller to the PIM, a command signal to transmit electrical current to the AC motor based on the first and second dq current trajectories.

2. The method of claim 1, wherein selecting the first and second dq current trajectories includes:
determining a maximum current magnitude for the AC motor; and
calculating the first and second dq current trajectories as projections in a plane of the DQ transform model based on the maximum current magnitude.

3. The method of claim 2, wherein determining the maximum current magnitude includes:
receiving operating temperature data for the AC motor and/or the PIM; and
predicting the maximum current magnitude as a function of the operating temperature data and the select output position.

4. The method of claim 2, wherein the first and second dq current trajectories are respectively calculated as $I_{dq1}=(I_{d1}, I_{q1})$ and $I_{dq2}=(I_{d2}, I_{q2})$, where:

$$I_d = -I_{ss}*\sin(\beta)$$

$$I_q = I_{ss}*\cos(\beta)$$

$$T_q = 1.5*PP*(\lambda_d I_q - \lambda_q I_d)$$

where Tq is the offset motor torque; $\beta$ is a current angle; $I_d$ is a d-axis current; $I_q$ is a q-axis current; PP is a number of pole pairs in the AC motor; $\lambda_d$ is a d-axis flux linkage; $\lambda_q$ is a q-axis flux linkage; and $I_{SS}$ is a current magnitude.

5. The method of claim 1, further comprising:
generating DQ reference frame voltage command signals based on the first and second dq current trajectories;
transforming the DQ reference frame voltage command signals to multiphase voltage command signals; and
determining a set of pulse-width modulation (PWM) control commands based on the multiphase voltage command signals,
wherein the command signal includes the set of PWM control commands.

6. The method of claim 5, wherein generating the DQ reference frame voltage command signals includes:
determining reference frame feedback current signals based on measured three-phase reference stator currents fed back from the AC motor;
calculating a dq current trajectory error as a mathematical summation of the first and second dq current trajectories and the reference frame feedback current signals; and
calculating the DQ reference frame voltage command signals as time functions of steady state operation of the AC motor based on the dq current trajectory error.

7. The method of claim 6, wherein transforming the DQ reference frame voltage command signals to the multiphase voltage command signals includes an inverse transformation from a rotating orthogonal frame of the DQ transform model to a static three-phase reference frame.

8. The method of claim 6, wherein determining the set of PWM control commands includes generating a plurality of switching vector signals based on a duty cycle associated with a predefined PWM period.

9. The method of claim 1, wherein the command signal includes a pulse-width modulation (PWM) switching frequency derived by oscillating back-and-forth between the first and second dq current trajectories and the first and second dq operating quadrants of the DQ transform model.

10. The method of claim 1, further comprising:
receiving, after transmitting the command signal to the PIM, measured three-phase reference stator currents fed back from the AC motor; and
transforming the measured three-phase reference stator currents to DQ reference frame voltage command signals.

11. The method of claim 10, wherein transforming the measured three-phase reference stator currents to the DQ reference frame voltage command signals includes an inverse transformation from a static three-phase reference frame to a rotating orthogonal frame of the DQ transform model.

12. The method of claim 1, wherein the motor output member includes a rotor shaft, the method further comprising receiving, via the vehicle controller, the select output position from an electronic position sensor attached to the rotor shaft.

13. The method of claim 12, further comprising determining an angular velocity of the AC motor as a derivative function of the select output position with respect to time.

14. A non-transitory, computer-readable medium storing instructions executable by one or more processors of a vehicle controller of a motor vehicle, the motor vehicle including an alternating current (AC) motor connected to a power inverter module (PIM), the instructions, when executed, causing the vehicle controller to perform operations comprising:
receiving a mode request to operate the motor vehicle in a stationary mode;
receiving a temperature request including a waste motor heat to be generated by the AC motor during operation of the motor vehicle in the stationary mode;
determining an offset motor torque to generate the waste motor heat and hold a motor output member of the AC motor at a select output position during operation of the motor vehicle in the stationary mode;
determining a direct-quadrature (DQ) transform model of the AC motor;
selecting first and second dq current trajectories respectively located in first and second dq operating quadrants of the DQ transform model based on the offset motor torque; and
transmitting a command signal to the PIM to transmit electrical current to the AC motor based on the first and second dq current trajectories.

15. A motor vehicle, comprising:
a vehicle body;
a plurality of road wheels attached to the vehicle body;
an alternating current (AC) motor attached to the vehicle body and operable to drive one or more of the road wheels to thereby propel the motor vehicle;
a battery pack attached to the vehicle body and operable to power the AC motor;
a power inverter module (PIM) electrically connecting the battery pack to the AC motor and operable to convert direct current (DC) power into alternating current (AC) power; and
a vehicle controller programmed to:
receive a mode request to operate the motor vehicle in a stationary mode;
receive a temperature request including a waste motor heat to be generated by the AC motor during operation of the motor vehicle in the stationary mode;
determine an offset motor torque to generate the waste motor heat and hold a motor output member of the AC motor at a select output position during operation of the motor vehicle in the stationary mode;
determine a direct-quadrature (DQ) transform model of the AC motor;
select first and second dq current trajectories respectively located in distinct first and second dq operating quadrants of the DQ transform model based on the offset motor torque; and
transmit a command signal to the PIM to transmit electrical current to the AC motor based on the first and second dq current trajectories.

16. The motor vehicle of claim 15, wherein selecting the first and second dq current trajectories includes:
determining a maximum current magnitude for the AC motor; and
calculating the first and second dq current trajectories as projections in a plane of the DQ transform model based on the maximum current magnitude.

17. The motor vehicle of claim 16, wherein determining the maximum current magnitude includes:
receiving operating temperature data for the AC motor and/or the PIM; and
predicting the maximum current magnitude as a function of the operating temperature data and the select output position.

18. The motor vehicle of claim 15, wherein the vehicle controller is further programmed to:
generate DQ reference frame voltage command signals based on the first and second dq current trajectories;
transform the DQ reference frame voltage command signals to multiphase voltage command signals; and
determine a set of pulse-width modulation (PWM) control commands based on the multiphase voltage command signals,
wherein the command signal includes the set of PWM control commands.

19. The motor vehicle of claim 15, wherein the command signal includes a pulse-width modulation (PWM) switching frequency to oscillate back-and-forth between the first and second dq current trajectories and the first and second dq operating quadrants of the DQ transform model.

20. The motor vehicle of claim 15, wherein the vehicle controller is further programmed to:
receive measured three-phase reference stator currents fed back from the AC motor after transmitting the command signal to the PIM; and
transform the measured three-phase reference stator currents to DQ reference frame voltage command signals.

* * * * *